(12) United States Patent
Chang et al.

(10) Patent No.: US 11,256,966 B2
(45) Date of Patent: Feb. 22, 2022

(54) SMART MEDICATION IDENTIFYING SYSTEM

(71) Applicant: SOUTHERN TAIWAN UNIVERSITY OF SCIENCE AND TECHNOLOGY, Tainan (TW)

(72) Inventors: Wan-Jung Chang, Tainan (TW); Liang-Bi Chen, Tainan (TW); Chia-Hao Hsu, Tainan (TW); Yi-De Yan, Tainan (TW); Zhi-Cheng Qiu, Tainan (TW); Tzu-Chin Yang, Tainan (TW); Chao-Yan Lin, Tainan (TW); Cheng-Pei Lin, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 293 days.

(21) Appl. No.: 16/456,024

(22) Filed: Jun. 28, 2019

(65) Prior Publication Data
US 2020/0184286 A1  Jun. 11, 2020

(30) Foreign Application Priority Data

Dec. 11, 2018  (TW) .................................. 107144586

(51) Int. Cl.

| | |
|---|---|
| *G06K 9/66* | (2006.01) |
| *H04L 29/08* | (2006.01) |
| *A61J 7/04* | (2006.01) |
| *A61J 1/10* | (2006.01) |
| *G06N 3/08* | (2006.01) |
| *H04L 67/1097* | (2022.01) |

(52) U.S. Cl.
CPC .................................... *G06K 9/66* (2013.01); *A61J 1/10* (2013.01); *A61J 7/04* (2013.01); *A61J 7/0418* (2015.05); *H04L 67/1097* (2013.01); *A61J 2205/50* (2013.01); *A61J 2205/60* (2013.01); *A61J 2205/70* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2016/0147976 A1* | 5/2016 | Jain | ........................ | A61J 1/035 705/2 |
| 2018/0260665 A1* | 9/2018 | Zhang | .................. | G06K 9/6276 |

FOREIGN PATENT DOCUMENTS

| | | |
|---|---|---|
| TW | M553633 U | 1/2018 |
| TW | I618534 B | 3/2018 |

* cited by examiner

*Primary Examiner* — Jianxun Yang
(74) *Attorney, Agent, or Firm* — Rosenberg, Klein & Lee

(57) ABSTRACT

A smart medication identifying system is disclosed herein. It comprises a processing device including a first processing module, a scanning module electrically connected to the first processing module and a first reminding module electrically connected to the first processing module; a cloud storage device electrically connected to the processing device and having a storage module, a login module electrically connected to the storage module, and a medication information database electrically connected to the storage module; and a medication identifying device electrically connected to the processing device and the cloud storage device and having a second processing module, an image identifying module electrically connected to the second processing module and a second reminding module electrically connected to the second processing module.

5 Claims, 4 Drawing Sheets

SMART MEDICATION IDENTIFYING SYSTEM

BACKGROUND OF THE INVENTION

1. Field of the Invention

The present invention relates to a smart medication identifying system which records the medication information on a drug bag that a user needs to take and reminds the user to correctly take them on time.

2. Description of Related Art

At present, the world has entered the stage of an aging society. Among the 7.5 billion people in the world, the elderly population accounts for 600 million people, of which 340 million have multiple chronic diseases. According to the statistics of the World Health Organization (WHO), the elderly suffer from more than one (an average of 1.4) type of chronic diseases, and the amount of drugs they take is five times that of the average person. Due to the decline in physiology of the elderly, the possibility of taking the wrong medicine is 7 times that of young people because of the wide variety of drugs. Reports showed that the cause of death in one third of the world's population are not by the disease itself but by irrational use of medicines, and the costs associated with these irrational use of medicines are quite high. The so-called irrational use of drugs includes overuse of drugs, prescription not in accordance with clinical guideline, inappropriate self-medication, intake of inept doses, and the like.

To solve the above-mentioned problems of irrational use of medicines, various smart medicine boxes have been developed on the market. For instance, American manufacturers developed Pill Drill which is a smart medication tracking system to conveniently store medicines and remind people to take medicines on time. The Taiwan patent No. TWI618534 (B), issued on 21 Mar. 2018, has disclosed an intelligent drug management device. It can automatically put the drugs from the drug containers into the corresponding drawer once the set time is up and transmit the sound from its speaker through the sound holes. At the same time, the illumination unit on the drawer lights up so as to remind the user to pull the drawer and take the medicine on time.

Furthermore, the Taiwan patent No. TWM553633 (U), issued on 1 Jan. 2018, has disclosed a smart medication box management system. It comprises a case body having a plurality of accommodating spaces therein for accommodating plural containers for placing drugs; a plurality of sensors respectively installed at bottoms of the plurality of accommodating spaces for measuring the weight of each of the plurality of accommodating spaces; and a central processing unit disposed in the case body and coupled to the plurality of sensors for determining whether the user has taken the medicine. Additionally, it comprises a warning module that reminds the user to take the medicine by flashing light or making a sound at the set medication time. However, the aforementioned patents or products currently on the market cannot identify various drugs. Patients with chronic diseases usually have to take a wide variety of drugs, so they are prone to inadvertently taking incorrect drugs and thus suffering from acute complications.

Accordingly, there is an urgent need for a system that can effectively identify drugs, record the user's medication information and remind the user to take the right medicine at the exactly medication time.

SUMMARY OF THE INVENTION

In view of the above-mentioned problems, the object of the present invention is to provide a smart medication identifying system which has a medication identifying device for recording the medication information on a drug bag, identifying whether the drug items and dose are correct before a user takes them, and exactly identifying drugs so as to reduce the incidence of irrational use of medicines and effectively assist the user in taking the right drugs.

Disclosed herein is a smart medication identifying system. It comprises a processing device having a first processing module, a scanning module electrically connected to the first processing module and a first reminding module electrically connected to the first processing module; a cloud storage device electrically connected to the processing device and having a storage module, a login module electrically connected to the storage module, and a medication information database electrically connected to the storage module; and a medication identifying device electrically connected to the processing device and the cloud storage device and having a second processing module, an image identifying module electrically connected to the second processing module and a second reminding module electrically connected to the second processing module.

According to an embodiment of the present invention, the storage module of the cloud storage device is electrically connected to the first processing module of the processing device.

According to an embodiment of the present invention, the second processing module of the medication identifying device is electrically connected to the first processing module of the processing device and the storage module of the cloud storage device.

According to an embodiment of the present invention, the storage module of the cloud storage device stores a user's personal information, medication information, medication status and medication identification results.

According to an embodiment of the present invention, the medication information database of the cloud storage device further comprises a training unit and an identification unit electrically connected to the training unit.

According to an embodiment of the present invention, the medication information database of the cloud storage device stores a plurality of medication images and medication information corresponding to the plurality of medication images.

According to an embodiment of the present invention, the cloud storage device and the medication identifying device use a deep learning technique to perform image recognition of single and multiple medications.

According to an embodiment of the present invention, each of the first reminding module and the second reminding module further comprise a timer and a speaker.

DETAILED DESCRIPTION OF THE PREFERRED EMBODIMENT

Hereinafter, an exemplary embodiment of the present invention will be described in detail with reference to the accompanying drawings.

Figure 1:
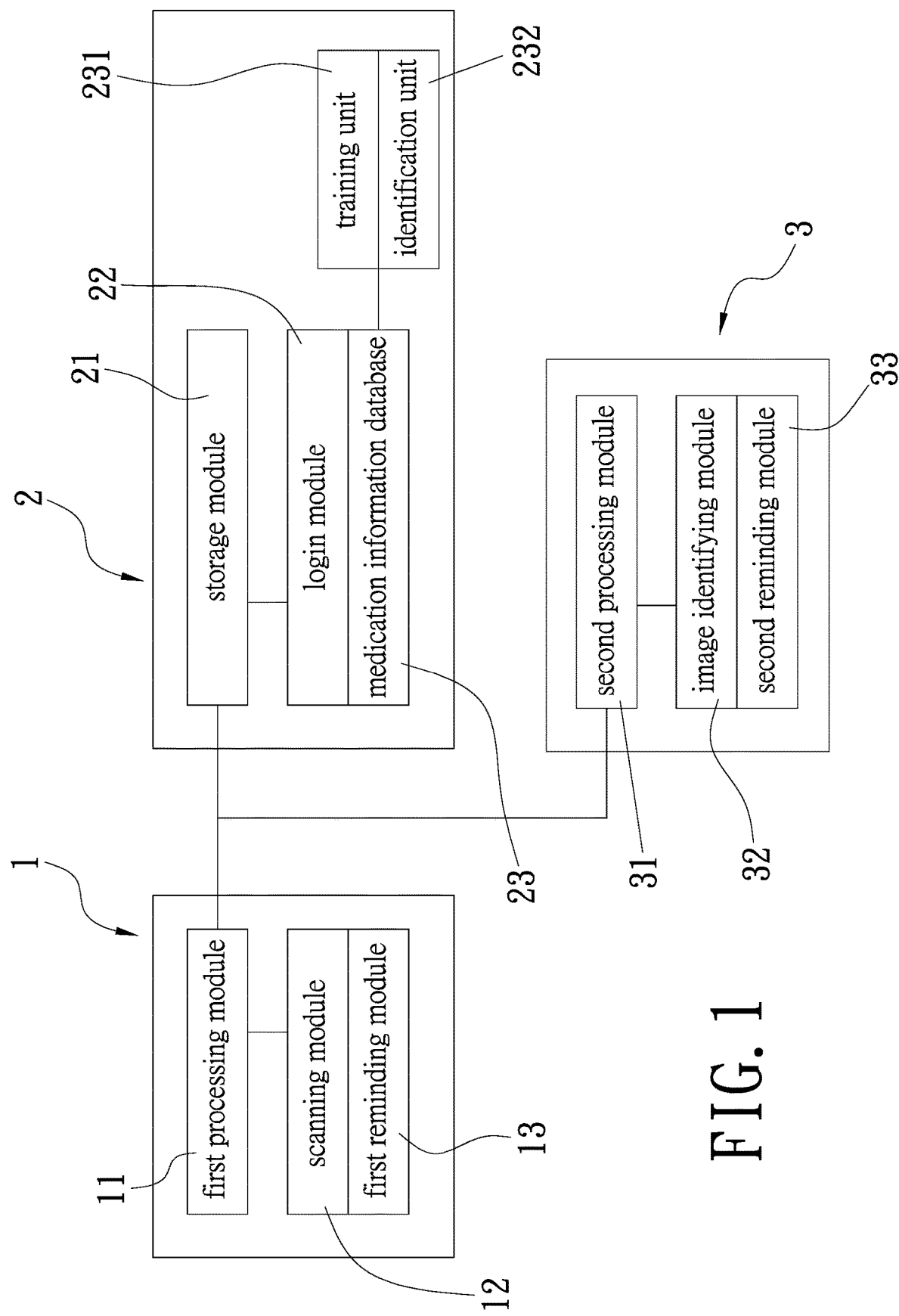
FIG. 1 is a block diagram showing a smart medication identifying system according to the present invention.
Figure 2:
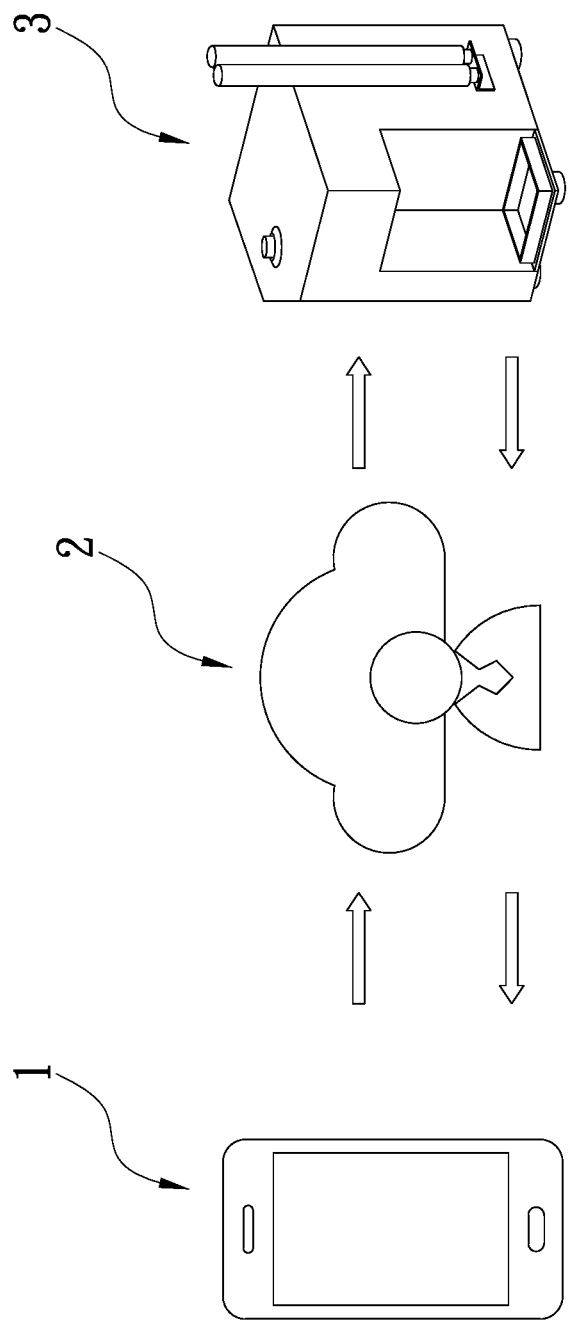
FIG. 2 is a schematic diagram showing transmissions of medication information among the processing device, a cloud storage device and a medication identifying device according to the present invention.

As showed in FIG. 1 and FIG. 2, a smart medication identifying system according to the present invention is disclosed herein. It mainly comprises a processing device (1), a cloud storage device (2), and a medication identifying device (3).

The processing device (1) has a first processing module (11), a scanning module (12) electrically connected to the first processing module (11) and a first reminding module (13) electrically connected to the first processing module (11). The first reminding module (13) further comprise a timer and a speaker.

The cloud storage device (2) is electrically connected to the processing device (1) and provided with a storage module (21) electrically connected to the first processing module (11), a login module (22) electrically connected to the storage module (21), and a medication information database (23) electrically connected to the storage module (21). The storage module (21) stores a user's personal information, medication information, medication status and medication identification results. The medication information database (23) has a training unit (231) and an identification unit (232) electrically connected to the training unit (231), and stores a plurality of medication images and medication information corresponding to the plurality of medication images.

The medication identifying device (3) is electrically connected to the processing device (1) and the cloud storage device (2) and uses deep learning technique. Furthermore, the medication identifying device (3) has a second processing module (31) electrically connected to the first processing module (11) and the storage module (21), an image identifying module (32) electrically connected to the second processing module (31), and a second reminding module (33) electrically connected to the second processing module (31). The second reminding module (33) further comprise a timer and a speaker.

Referring to FIG. 1 and FIG. 2, the processing device (1), the cloud storage device (2) and the medication identifying device (3) of the present invention are interconnected. For instance, the processing device (1) is a mobile device, e.g. a tablet or a smart phone. In order to realize the communication of information, the present invention uses the MQTT (Message Queuing Telemetry Transport) communication protocol in addition to the HTTP communication protocol, so that the processing device (1) and the cloud storage device (2) can quickly collect information. In use of the present invention, the user first logs in from the account authentication mechanism of the processing device (1). In detail, the user first logs in to the login module (22) of the cloud storage device (2) by the first processing module (11) of the processing device (1), and then the cloud storage device (2) reads the personal information of the corresponding user from the storage module (21). The medication identifying device (3) uploads the drug images to the cloud storage device (2) after each identification, and then collects a certain number of drug samples to perform deep learning training and update an identification model, so the identification accuracy can be promoted.

In practical use of the present invention, a scanning option of the processing device (1) is first clicked to turn on the scanning module (12). After the scanning module (12) scans the two-dimensional (2D) barcode (e.g. QR Code) on the drug bag, the first processing module (11) reads the information of the 2D barcode and transmits the medication information of the user's drug bag to the storage module (21) of the cloud storage device (2) through the first processing module (11). In this way, the storage module (21) stores the medication information including the drug name, the time of taking the drug, the drug dosage and the like.

Figure 3:
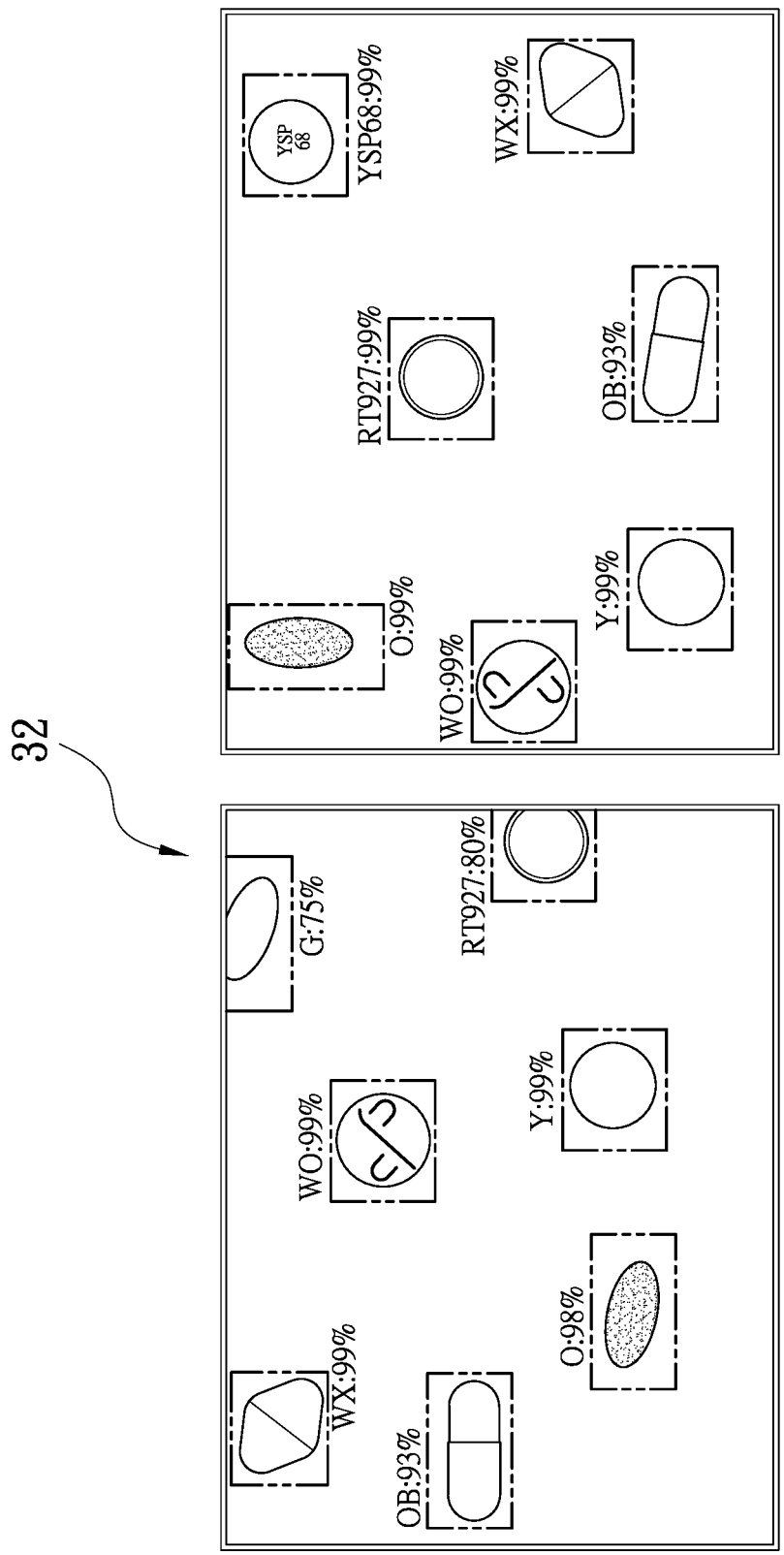
FIG. 3 is a schematic diagram showing an image identifying module for medication identification according to the present invention.
Figure 4:
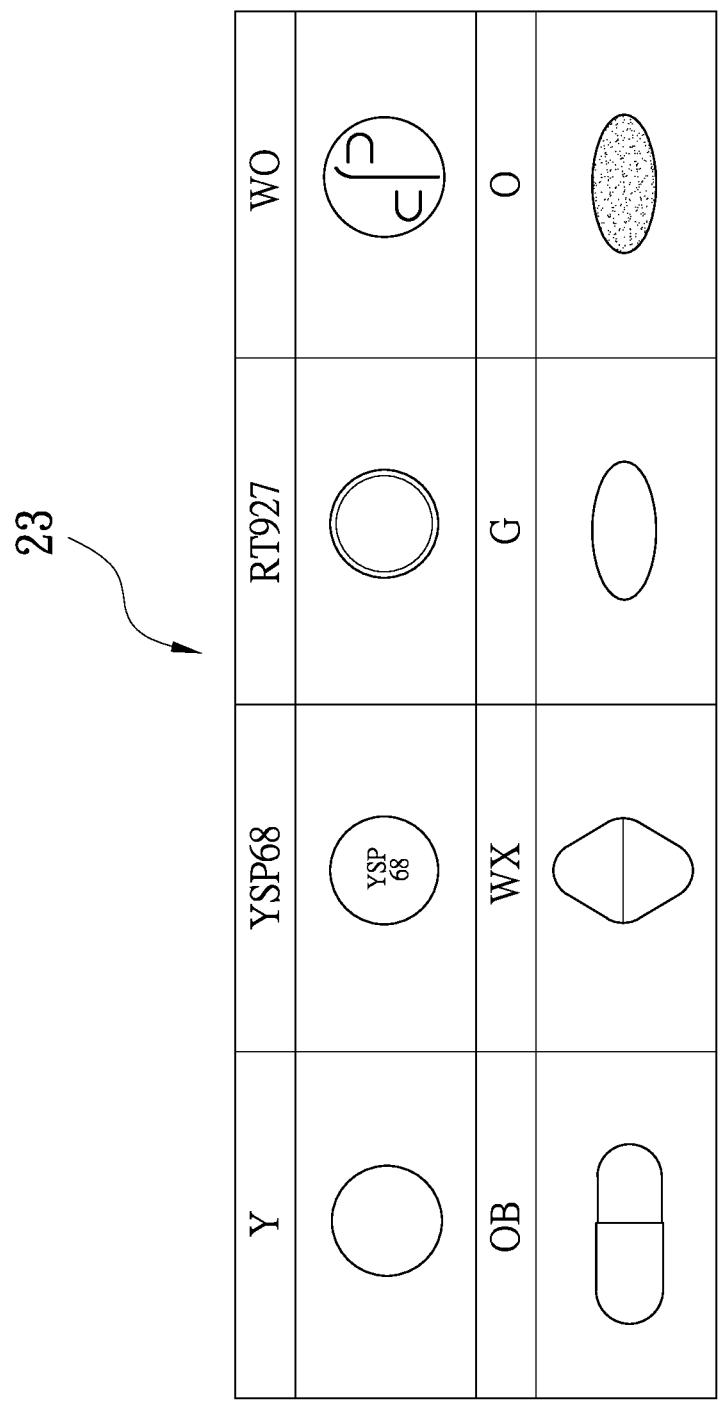
FIG. 4 is a schematic diagram showing a medication information database storing codes for various medications according to the present invention.

Continually, the cloud storage device (2) transmits the medication information stored in the storage module (21) to the medication identifying device (3), and the medication identifying device (3) sets the time of taking the medications. In such a case, the second reminding module (33) sends a voice at a specific set time to remind the user to take the drug. If the user also sets the time of taking the medications by the first reminding module (13) of the processing device (1), the first reminding module (13) reminds the user to take the drug simultaneously. After the user puts the medications into the identification area of the medication identifying device (3) and presses the button for identification, the image identifying module (32) then take a photo of the identification area by a photographic lens of the image identifying module (32) for analysis and identification of the medications in the photo. As shown in FIG. 3 and FIG. 4, each medication has its own code. After the image identifying module (32) having the identification model identifies the medications, the medication information corresponding to the medications in the storage module (21) of the cloud storage device (2) is read for further confirming whether the items and dosage of the medications are correct. After the comparison is completed, the second processing module (31) sends a signal to the second reminding module (33) and informs the user of relevant information by voice, e.g. correct medication, wrong medication, too much medicine, too little medicine, and the like. If the drug name and the drug dosage put in the identification area is correct, the user can take the medications.

Additionally, the second processing module (31) of the medication identifying device (3) transmits the identification result back to the storage module (21) of the cloud storage device (2) and presents it on the relevant webpage, so the user or his family can conveniently check the records of medication status, e.g. drug name, drug dosage, actual medication time and the like. The first processing module (11) of the processing device (1) also receives the record of the storage module (21) of the cloud storage device (2), so that the user can also watch records of the medication status (e.g. drug name, drug dosage, actual medication time and the like) through the processing device (1) to ensure proper medication and control of his own condition.

Furthermore, the image identifying module (32) of the present invention improves the success rate of drug identification through deep learning techniques when analyzing and identifying the photos taken by the image identifying module (32). In the present invention, convolutional neural networks (CNN) are mainly used as the basic architecture. The images of the various medications need to be collected in advance and stored in the training unit (231) of the medication information database (23) for training. For example, 5,000 pictures of various drugs, including 4000 pictures of single drugs and 1000 pictures of multiple drugs, are prepared and stored in the medication information database (23) for training for 26 hours. Then, the identification unit (232) identifies the drugs in the photo according to the parameters after training. The identification unit (232) primarily transmits photos to Faster RCNN. Faster RCNN is a CNN object detection method and can extract features of photos and frame them with areas in which the objects may be present. Then, various framed areas are converted into fixed sizes and input to InceptionV3 to determine the types of objects in the framed areas. In this way, the types of drugs in the photo can be identified, and the average success rate of drug identification is over 90%. The trained identification model is then transmitted to the image identifying module (32) for drug identification.

Compared with the technique available now, the present invention has the following advantages:

1. The present invention can scan the 2D barcode on the drug bag by the scanning module and store medication information in the cloud storage device for further transmitting to the medication identifying device, so the medication identifying device can set the time for taking the medicine and send a voice at a specific set time to remind the user to take the medicine. Furthermore, the processing device can also remind the user to take the drug at the same time if it also set to remind at a specific set time.

2. The image identifying module of the present invention can be trained to identify the user's drugs by comparing medication images so as to confirm whether the drugs taken by the user is correct.

3. The medication information database of the present invention having the training unit enables the image identifying module to recognize different drug appearances by means of deep learning, so a high recognition accuracy is achieved after the image identifying module is trained. Specifically, the average success rate of drug identification reaches over 90%.

What is claimed is:

1. A smart medication identifying system, comprising:
    a processing device having a first processing module, a scanning module electrically connected to the first processing module and a first reminding module electrically connected to the first processing module;
    a cloud storage device electrically connected to the processing device and having a storage module, a login module electrically connected to the storage module, and a medication information database electrically connected to the storage module, the medication information database further including a training unit and an identification unit electrically connected to the training unit; and
    a medication identifying device electrically connected to the processing device and the cloud storage device and having a second processing module, an image identifying module electrically connected to the second processing module and a second reminding module electrically connected to the second processing module, the second processing module being electrically connected to the first processing module of the processing device and the storage module of the cloud storage device,
    wherein the cloud storage device and the image identifying module use a deep learning technique to perform image recognition of individual medications and their respective dosages when one of a user's medication or multiple medications together are imaged by the image identifying module, and thereby confirms if a user's medications and dosages are correct.

2. The smart medication identifying system as claimed in claim 1, wherein the storage module of the cloud storage device is electrically connected to the first processing module of the processing device.

3. The smart medication identifying system as claimed in claim 1, wherein the storage module of the cloud storage device stores a user's personal information, medication information, medication status and medication identification results.

4. The smart medication identifying system as claimed in claim 1, wherein the medication information database of the cloud storage device stores a plurality of medication images and medication information corresponding to the plurality of medication images.

5. The smart medication identifying system as claimed in claim 1, wherein each of the first reminding module and the second reminding module further comprises a timer and a speaker, the second reminding module outputting voice messages responsive to the image recognition performed by the image identifying module.

* * * * *